United States Patent [19]
Bonanni et al.

[11] Patent Number: 5,204,925
[45] Date of Patent: Apr. 20, 1993

[54] OPTICAL INTERCONNECTION OF CIRCUIT PACKS

[75] Inventors: Rocco Bonanni, Wayne; William J. Parzygnat, Morris Township, Morris County; Roger E. Weiss, Denville, all of N.J.

[73] Assignee: AT&T Bell Laboratories, Murray Hill, N.J.

[21] Appl. No.: 757,870

[22] Filed: Sep. 11, 1991

[51] Int. Cl.⁵ ............................................. G02B 6/42
[52] U.S. Cl. ...................................... 385/89; 385/76
[58] Field of Search .................. 385/89, 75, 76, 55, 385/56

[56] References Cited

U.S. PATENT DOCUMENTS

| | | | |
|---|---|---|---|
| 4,225,213 | 9/1980 | McBride, Jr. et al. | 385/89 |
| 4,541,882 | 9/1985 | Lassen | 156/150 |
| 4,678,264 | 7/1987 | Bowen et al. | 385/89 |
| 4,725,120 | 2/1988 | Parzygnat | 350/96.22 |
| 4,818,058 | 4/1989 | Bonanni | 350/96.2 |
| 4,863,232 | 9/1989 | Kwa | 385/89 |
| 4,934,778 | 6/1990 | Gillett | 385/55 |
| 4,981,336 | 1/1991 | Mohan | 385/56 |
| 4,998,796 | 3/1991 | Bonanni et al. | 350/96.21 |

Primary Examiner—John D. Lee
Assistant Examiner—Phan Thi Heartney
Attorney, Agent, or Firm—Lester H. Birnbaum

[57] ABSTRACT

Disclosed is an apparatus for the optical interconnection of circuit packs and components mounted on circuit packs, and a method of manufacture. Optical fibers are bonded to a flexible substrate. The substrate includes tabs that can be terminated by standard V-groove silicon chip connectors for optical connection to the edges of circuit packs.

19 Claims, 4 Drawing Sheets

OPTICAL INTERCONNECTION OF CIRCUIT PACKS

BACKGROUND OF THE INVENTION

This invention relates to optical connection between circuit packs and optical components on circuit packs.

Circuit packs comprise a circuit board and a plurality of semiconductor components mounted thereon. Typical systems for interconnecting a plurality of circuit packs involve placing a connector on the edge of the circuit board and inserting the pack into a shelf so that the connector mates with pins on a backplane. In an increasing number of applications, an optical as well as electrical interconnection is desirable between circuit packs. In present systems, the fibers are left to hang loose between the packs, which tends to create a "rat's nest" of fibers. With the increasing complexity of such systems and the need for greater optical interconnection, this type of approach becomes unwieldy.

SUMMARY OF THE INVENTION

The invention is an optical interconnection apparatus comprising a flexible substrate including a main body portion and a plurality of tab portions extending therefrom. A plurality of optical fibers is mounted to the substrate so that their end portions extend beyond the edges of the tabs. Optical fiber termination means are provided at the edges of the tabs to permit connection to the optical fibers.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION OF THE INVENTION

Figure 1:
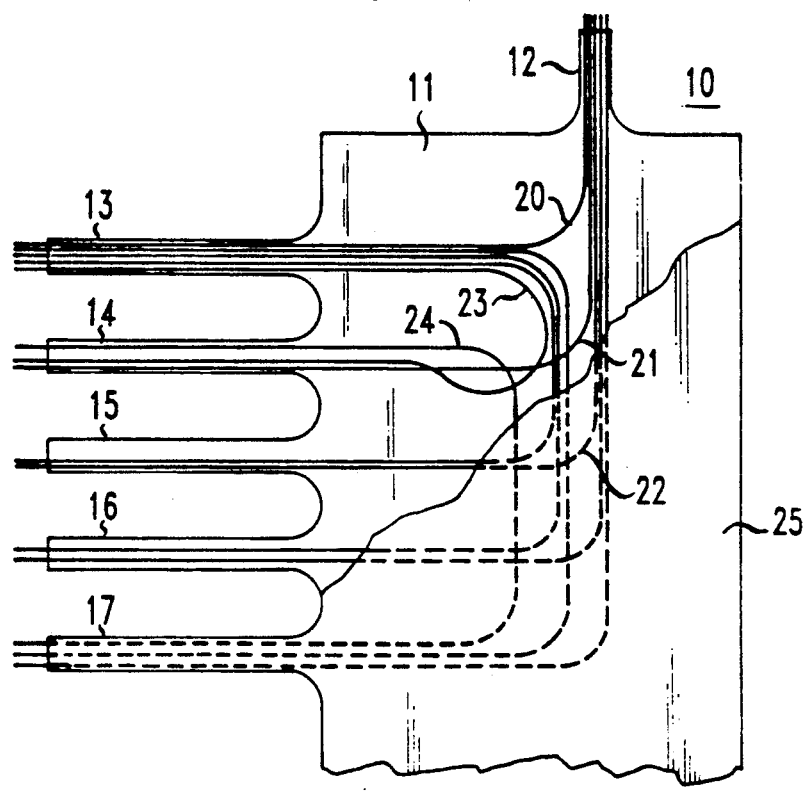
FIG. 1 is a plan view, partly cut away, of a portion of an interconnection apparatus in accordance with an embodiment of the invention.

FIG. 1 illustrates a portion of the interconnection apparatus in accordance with the invention. A flexible substrate or base layer, 10, is provided with a main body portion, 11, in a generally rectangular shape, and a plurality of tab portions 12-17 which extend from the main body portion. The substrate can be, typically, a flexible polymer such as Mylar ® or Kapton ®, with a thickness in the range 25-200 microns. Any number of tab portions can be provided according to particular needs. In a typical example, a tab portion might be approximately 15 cm long and 0.6 cm wide.

Mounted on a major surface of the substrate, 10, is a plurality of optical fibers, such as fibers 20-24. The fibers can be mounted by depositing a pressure-sensitive adhesive, such as a silicon adhesive sold by Petrarch Systems under the designate Glassclad PSA, on the substrate 10 and/or on the fiber jackets, and then laying down the fibers in the desired pattern. It will be noted that each fiber has its ends extending between two of the tabs. For example, fiber 20 extends between tab 12 and tab 13, while fiber 21 extends between tabs 12 and 14. As further examples, fiber 23 extends between tabs 13 and 14, and fiber 24 extends between tabs 14 and 17. It will be appreciated, therefore, that a fiber distribution network is formed on the substrate, 10, where the fibers can be positioned between any two tabs.

Once the fibers have been mounted to the substrate, 10, a cover layer 25 is formed over the fibers and substrate. This layer can be, for example, a layer of the same material as the substrate which is formed over the substrate by lamination. The cover layer preferably extends over the entire surface of the substrate, 10, including the tabs 12-17. The layer will generally have a thickness in the range 25-200 microns.

Once the cover layer is applied, the fiber ends at each tab can be terminated to permit optical connection with other components. An example of one type of termination is shown in the magnified plan view of tab 13 illustrated in FIG. 2 and in the perspective view of FIG. 3. (It will be appreciated that the cover layer has been removed in FIG. 2, and both the cover layer and substrate are not shown in FIG. 3 in order to more clearly illustrate the termination.) The termination is basically that shown in U.S. Pat. No. 4,998,796 issued to Bonanni, and incorporated by reference herein.

As previously mentioned, the ends of the fibers, e.g. 20, extend a certain distance beyond the edge of the tab, 13. This distance is typically 0.8-1.5 cm. A pair of silicon chips, 30 and 31, each with V-grooves etched in one major surface, are placed within a holder 32. (Chip 31 has been removed from FIG. 2 for illustrative purposes.) The holder and chip combination is then placed on the edge of the tab, 13, so that each fiber portion extending beyond the tab edge is inserted into a V-groove formed by the facing surfaces of the chips 30 and 31. The silicon chips are bonded together with epoxy. The ends of the fibers extending past the silicon chips can then be cut and polished according to standard techniques so that the fiber ends are made coplanar and flush with the edges of the V-grooves.

Figure 2:
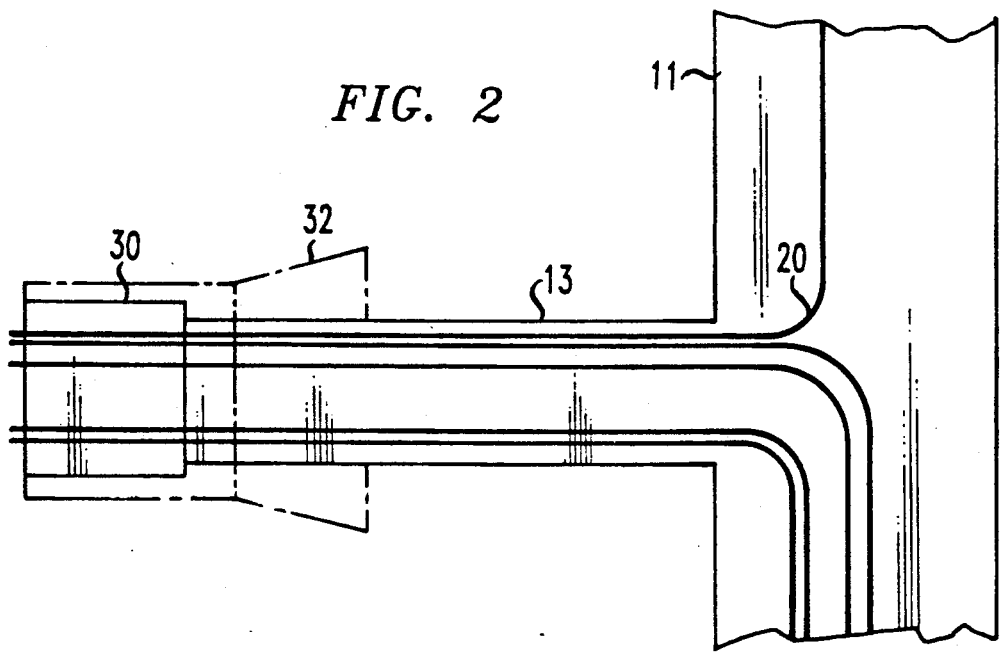
FIG. 2 is a plan view of a portion of an interconnection apparatus in accordance with the same embodiment.
Figure 3:
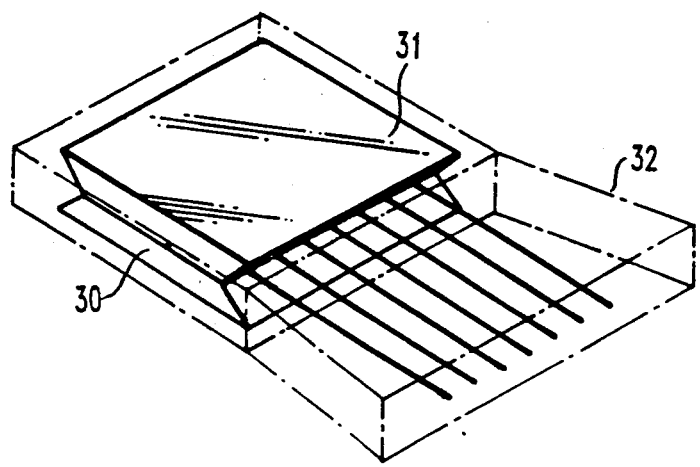
FIG. 3 is a perspective view of a portion of the apparatus of FIG. 2.

A connector housing and other standard parts (not shown) can be placed around the termination assembly in FIGS. 2 and 3 to form a plug which can be mated with another plug of the same design to form an optical connection. (See, e.g., U.S. Pat. No. 4,725,120 issued to Parzygnat and U.S. Pat. No. 4,818,058 issued to Bonanni, which are incorporated by reference herein.)

Figure 4:
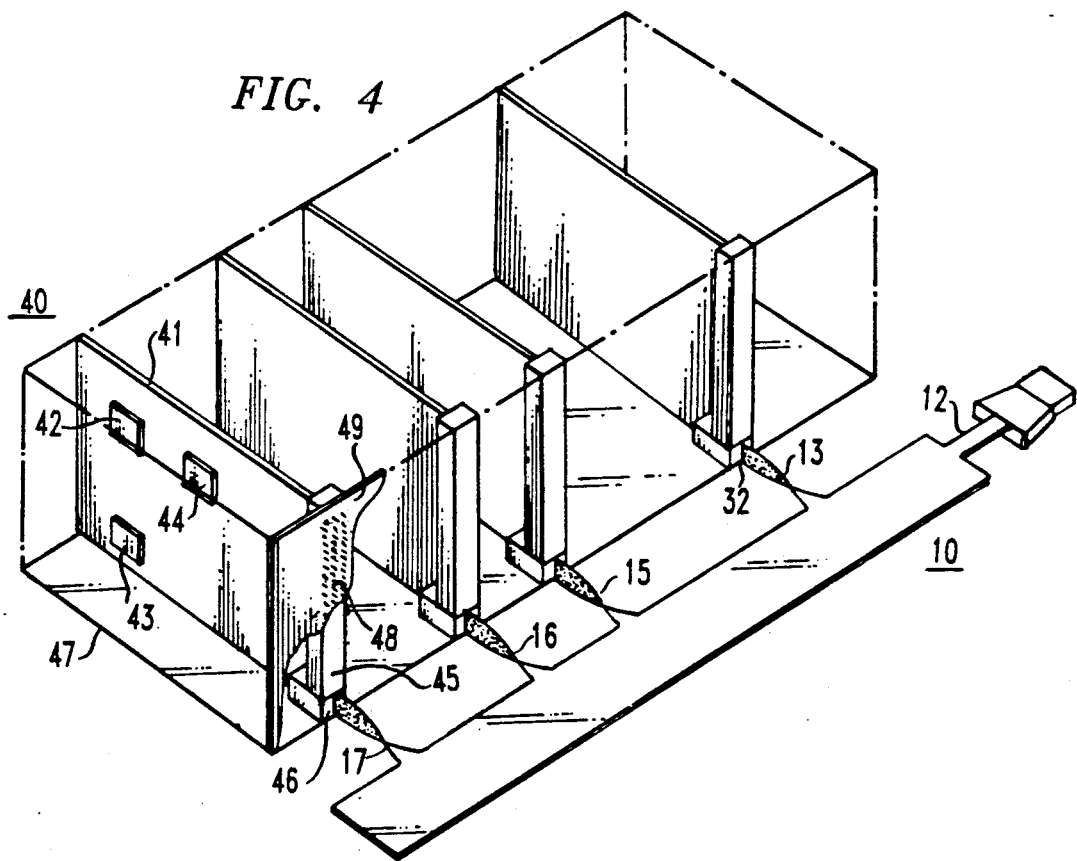
FIG. 4 is a perspective view of an interconnection system including apparatus such as shown in FIGS. 1-3.

FIG. 4 shows an example of the use of an optical interconnection apparatus such as appears in FIGS. 1-3 in an optical interconnection system. The system includes a plurality of circuit packs, e.g., 40, each comprising a printed circuit board, 41, with a plurality of semiconductor components, e.g., 42-44, mounted on one or both major surfaces. An electrical connector, 45, and an optical connector, 46, are provided on the edge of each circuit board. Each circuit pack is slid into an appropriate position on a shelf 47 so that the electrical connector engages an array of pins, e.g., 48, positioned in a backplane 49. (Most of the backplane has been cut away for purposes of illustration.) Electrical interconnection between the circuit packs is, therefore, provided through the backplane either by wires wrapped around the pins or by printed conductors on the backplane (not shown).

Optical interconnection between the circuit packs, and between the circuit packs and other equipment, is provided by the optical interconnection apparatus, 10, previously described. It will be noted that the terminations at the ends of the tabs each plug into an optical connector of a respective circuit pack. In this embodiment, each tab is twisted approximately 90 degrees to provide the proper orientation of the terminations and connectors. Optical input and output is provided at tab 12 where the termination can be plugged into an optical cable connector connected to other pieces of equipment.

Figure 5:
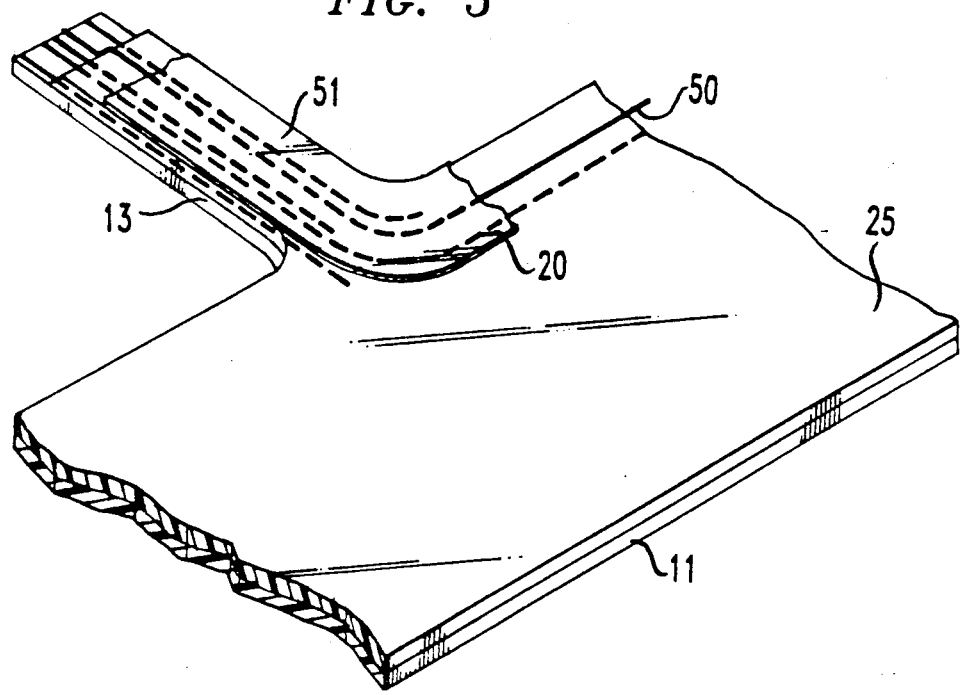
FIG. 5 is a perspective view of a portion of an interconnection apparatus in accordance with an embodiment of the invention illustrating a repair feature of the invention.

FIG. 5 is a magnified view of a tab, e.g., 13, illustrating an important feature of the invention. If a fiber, e.g., 20, is found to be defective, the terminations on the tabs which include the ends of the fiber are removed. A short piece of the cover layer, 25, at the end of the tabs is cut away exposing the fiber ends. The exposed portion of the defective fiber is then cut off. A new adhesive coated fiber, 50, is placed on the top layer 25 overlying essentially the same position as the defective fiber, 20. The tips of the new fiber, 50, will extend beyond the ends of the tabs where the portions of the old fiber had been cut off. A tape, 51, is then placed over the new fiber and extending to the ends of the tabs in order to protect the new fiber as well as the exposed ends of the other fibers at the tabs. The terminations can then be placed on the ends of the tabs as previously described. Thus, any defective fiber can be effectively replaced without removing the cover layer and disturbing the other fibers.

Figure 6:
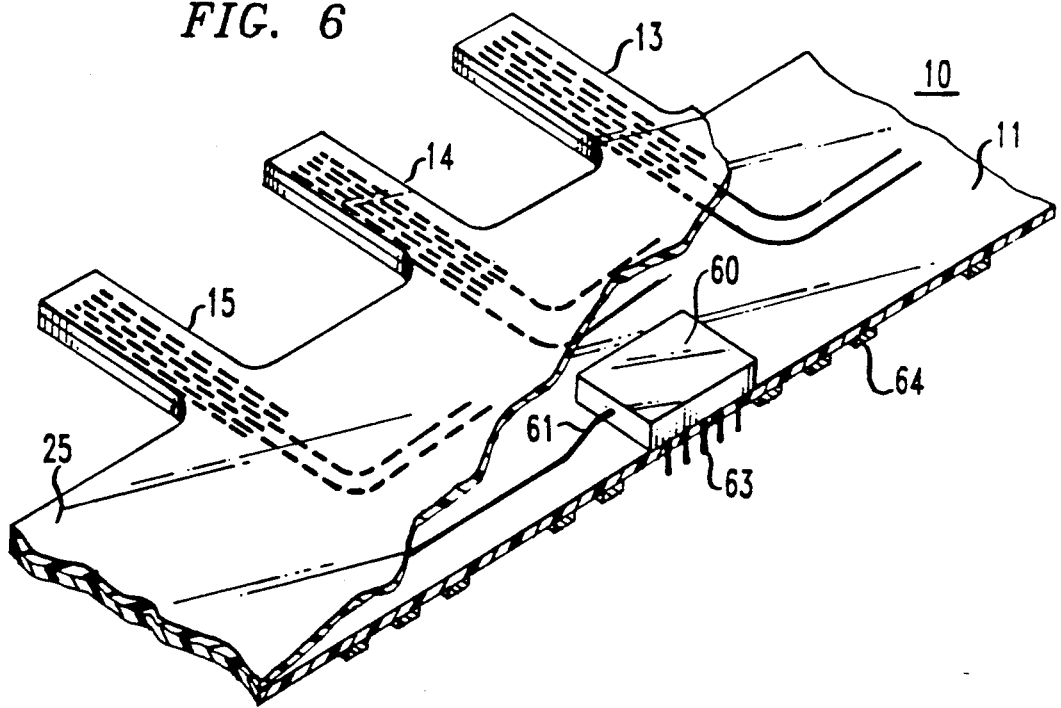
FIG. 6 is a perspective view of a portion of an interconnection apparatus in accordance with a further embodiment of the invention.

As illustrated in the embodiment of FIG. 6, elements other than optical fibers can be included on the interconnection apparatus 10. In this example, an electrooptic device, 60, such as a laser and/or a light detector, can be bonded to the substrate 11. The device is bonded by soldering the device leads, e.g., 63, in plated through-holes formed in the substrate 11. However, surface mounting can also be employed. The device includes a fiber pigtail, 61, coupled thereto which can be routed anywhere on the substrate surface to an appropriate tab. As before, a cover layer, 25, protects the fibers. Conductive elements can be provided in the form of conventional plated copper conductors, e.g., 64, deposited on the surface of the substrate opposite to the fibers.

Figure 7:
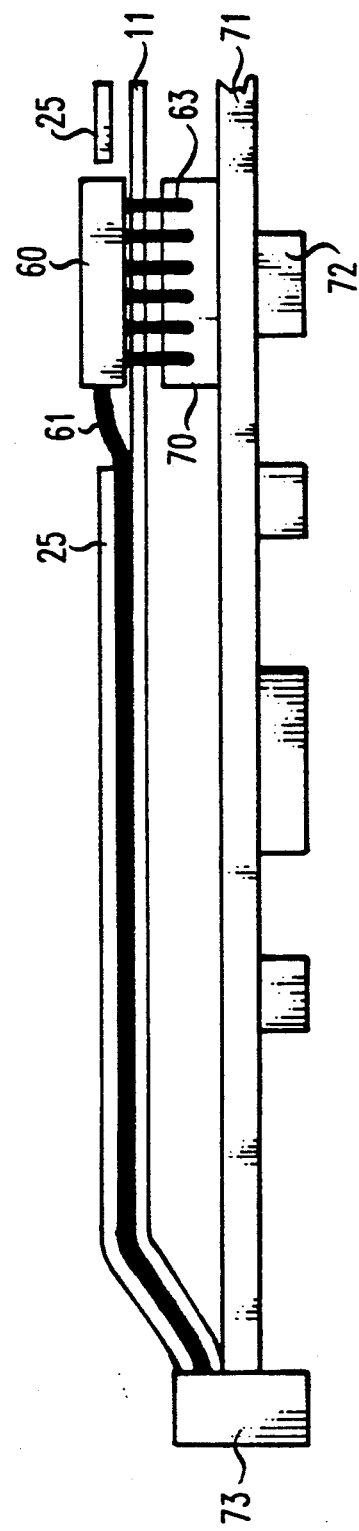
FIG. 7 is a side view of a portion of an interconnection apparatus in accordance with a further embodiment of the invention.

FIG. 7 illustrates a side view of an alternative embodiment. Here, the electrooptic device 60 is through-hole bonded to a non-conducting substrate, 11. The leads of the device, e.g., 63, are inserted into a socket-type electrical connector, 70, which is mounted to a printed circuit board, 71. Semiconductor components, e.g., 72, can be mounted on the surface of the board opposite to the socket, along with conductive elements (not shown). At the edge of the printed circuit board is an optical connector, 73, which accommodates the tab including the fiber pigtail 61.

Various additional modifications of the invention will become apparent to those skilled in the art. All such variations which basically rely on the teachings through which the invention has advanced the art are properly considered within the scope of the invention.

We claim:

1. Optical interconnection apparatus comprising:
   a flexible substrate including a main body portion and a plurality of tab portions extending therefrom, said tab portions being capable of twisting at an angle with respect to the body portion;
   a plurality of optical fibers mounted to the substrate so that their ends extend beyond the edges of the tabs and the ends of a plurality of fibers extend to different tabs; and
   optical fiber termination means at the edges of the tabs to permit connection to the optical fibers.

2. The apparatus according to claim 1 wherein the termination means comprises a pair of silicon chips with grooves formed in at least one major surface, the ends of the fibers beyond the tab edges being positioned in the grooves.

3. The apparatus according to claim 1 wherein the substrate comprises a flexible polymer.

4. The apparatus according to claim 3 wherein the thickness of the substrate is within the range 25–200 microns.

5. The apparatus according to claim 1 wherein a cover layer comprising a flexible polymer is formed over the optical fibers.

6. The apparatus according to claim 5 wherein the cover layer has a thickness in the range 25–200 microns.

7. The apparatus according to claim 1 wherein the optical fibers are mounted to the substrate by means of an adhesive layer between the surface of the substrate and the optical fibers.

8. The apparatus according to claim 1 wherein both ends of some fibers extend to different tabs than both ends of some other fibers.

9. The apparatus according to claim 1 wherein one end of at least two fibers extends to the same tab while their opposite ends extend to different tabs.

10. The apparatus according to claim 1 further comprising a plurality of circuit packs with optical connectors on one edge, each termination means being connected to a corresponding optical connector.

11. The apparatus according to claim 10 wherein the tabs are twisted approximately 90 degrees with respect to the body portion.

12. The apparatus according to claim 1 wherein at least one defective fiber is cut from the edges of the tabs and a replacement fiber is formed over the defective fiber with its ends extending beyond the edges of the tabs where the defective fiber has been cut.

13. The apparatus according to claim 1 further comprising an electrooptic device mounted on the substrate.

14. The apparatus according to claim 13 further comprising a plurality of conductive elements formed on a surface of the substrate.

15. The apparatus according to claim 13 further comprising a printed circuit board including a plurality of components thereon, and means for electrically connecting the electrooptic device to the circuit board.

16. The apparatus according to claim 13 wherein the device includes an optical fiber coupled thereto.

17. A method of fabricating an optical interconnection apparatus comprising the steps of:
   providing a flexible substrate including a main body portion and a plurality of tab portions extending therefrom said tab portions being capable of twisting at an angle with respect to the body portion;

mounting to the substrate a plurality of optical fibers, each including two ends which extend beyond the edges of different tabs such that the ends of said plurality of fibers extend to different tabs;

forming a cover layer over the fibers; and providing termination means at the edges of the tabs to permit connection to the optical fibers.

18. The method according to claim 17 wherein the fibers are mounted to the substrate by forming an adhesive layer on the surface of the substrate and placing each fiber thereon.

19. The method according to claim 17 wherein at least one defective fiber is replaced by cutting off the ends of the defective fiber at the edges of the tabs, and mounting a replacement fiber over the cover layer so that the ends of the replacement fiber extend to the areas of the tabs where the defective fiber has been cut.

* * * * *